US007764648B2

(12) United States Patent
Gopinath et al.

(10) Patent No.: US 7,764,648 B2
(45) Date of Patent: Jul. 27, 2010

(54) METHOD AND SYSTEM FOR ALLOWING AND PREVENTING WIRELESS DEVICES TO TRANSMIT WIRELESS SIGNALS

(75) Inventors: Krishnamurthy N Gopinath, Bangalore (IN); Pravin Bhagwat, Kendall Park, NJ (US)

(73) Assignee: AirTight Networks Inc., Mountain View, CA (US)

( * ) Notice: Subject to any disclaimer, the term of this patent is extended or adjusted under 35 U.S.C. 154(b) by 0 days.

(21) Appl. No.: 12/329,644

(22) Filed: Dec. 8, 2008

(65) Prior Publication Data

US 2009/0310546 A1 Dec. 17, 2009

Related U.S. Application Data (63) Continuation of application No. 11/230,436, filed on Sep. 19, 2005, now Pat. No. 7,496,094, which is a continuation of application No. 11/087,061, filed on Mar. 21, 2005, now abandoned, which is a continuation-in-part of application No. 10/931,499, filed on Aug. 31, 2004.

(60) Provisional application No. 60/560,034, filed on Apr. 6, 2004.

(51) Int. Cl.
*H04W 4/02* (2009.01)
(52) U.S. Cl. .................. 370/329; 455/62; 370/389; 370/328; 370/235; 370/336
(58) Field of Classification Search ................. 370/329, 370/235, 336; 455/62
See application file for complete search history.

(56) References Cited

U.S. PATENT DOCUMENTS

| 7,058,796 | B2 * | 6/2006 | Lynn et al. ..................... 713/1 |
| 7,532,904 | B2 * | 5/2009 | Lin ............................. 455/509 |
| 2002/0006111 | A1 * | 1/2002 | Akita et al. ................. 370/235 |
| 2004/0147202 | A1 * | 7/2004 | Brabrand ..................... 446/454 |
| 2004/0255033 | A1 * | 12/2004 | Edney et al. ................ 709/229 |

* cited by examiner

*Primary Examiner*—David Q Nguyen
(74) *Attorney, Agent, or Firm*—AirTight Networks; Hemant M. Chaskar (57) ABSTRACT

A method for arbitrating use of wireless medium for transmission of wireless signals within a selected local geographic region. The selected local geographic region comprises a first set of a plurality of devices to be allowed to transmit wireless signals and a second set of one or more devices to be substantially restricted from transmitting wireless signals. The method includes providing identity information associated with the first set of wireless devices. The method includes transmitting over a wireless medium at least one packet for each of the wireless devices in the first set. The at least one packet for each of the wireless devices includes an identity information, including an address, associated with that wireless device. That wireless device is a recipient of the one packet on the wireless medium. The at least one packet also has a selected value in a duration field of at least the one packet. The selected value is associated with a portion of time for which that wireless device is to be allowed to transmit wireless signals within the selected local geographic region while restricting at least the wireless devices in the second set.

18 Claims, 8 Drawing Sheets

METHOD AND SYSTEM FOR ALLOWING AND PREVENTING WIRELESS DEVICES TO TRANSMIT WIRELESS SIGNALS

CROSS-REFERENCES TO RELATED APPLICATIONS

This present application is a continuation application of the U.S. patent application Ser. No. 11/230,436, titled "Method and System for Allowing and Preventing Wireless Devices to Transmit Wireless Signals", filed on Sep. 19, 2005 (U.S. Pat. No. 7,496,094, issued on Feb. 24, 2009), which in turn is a continuation application of the U.S. patent application Ser. No. 11/087,061, titled "Method and System for Allowing and Preventing Wireless Devices to Transmit Wireless Signals", filed on Mar. 21, 2005, now abandoned which in turn is a continuation in part application of the U.S. patent application Ser. No. 10/931,499, titled "Method and a System for Regulating, Disrupting and Preventing Access to the Wireless Medium", filed on Aug. 31, 2004, which in turn claims priority to the U.S. Provisional Application No. 60/560,034, titled "A Method and a System for Reliably Regulating, Disrupting and Preventing Access to Wireless Medium Through Distributed Passive and Active Wireless Sniffers", filed on Apr. 6, 2004, each of which is hereby incorporated by reference herein.

BACKGROUND OF THE INVENTION

The present invention relates generally to wireless computer networking techniques. More particularly, the invention provides methods and systems for restricting undesirable wireless activity in local area networks with wireless extensions. These methods and systems can be applied to many computer networking environments, e.g. environments based upon the IEEE 802.11 family of standards (WiFi) and others that use shared transmission medium.

Computer systems have proliferated from academic and specialized science applications to day-to-day business, commerce, information distribution and home applications. Such systems can include personal computers (PCs) to large mainframe and server class computers. Powerful mainframe and server class computers run specialized applications for banks, small and large companies, e-commerce vendors, and governments. Personal computers can be found in many offices, homes, and even local coffee shops.

The computer systems located within a specific local geographic region (e.g. an office, building floor, building, home, or any other defined indoor and/or outdoor geographic region) are typically interconnected using a Local Area Network (LAN) (e.g. the Ethernet). The LANs, in turn, can be interconnected with each other using a Wide Area Network (WAN) (e.g. the Internet). A conventional LAN can be deployed using an Ethernet-based infrastructure comprising cables, hubs switches, and other elements.

Connection ports (e.g. Ethernet ports) can be used to couple multiple computer systems to the LAN. For example, a user can connect to the LAN by physically attaching a computing device (e.g. a laptop, desktop, or handheld computer) to one of the connection ports using physical wires or cables. Other types of computer systems, such as database computers, server computers, routers, and Internet gateways, can be connected to the LAN in a similar manner. Once physically connected to the LAN, a variety of services can be accessed (e.g. file transfer, remote login, email, WWW, database access, and voice over IP).

Using recent (and increasingly popular) wireless technologies, users can now be wirelessly connected to the computer network. Thus, wireless communication can provide wireless access to a LAN in the office, home, public hot-spot, and other geographical locations. The IEEE 802.11 family of standards (also called Wireless Local Area Network, WLAN or WiFi) is a common standard for such wireless communication. In WiFi, the 802.11b-standard provides for wireless connectivity at speeds up to 11 Mbps in the 2.4 GHz radio frequency spectrum; the 802.11g standard provides for even faster connectivity at about 54 Mbps in the 2.4 GHz radio frequency spectrum; and the 802.11a standard provides for wireless connectivity at speeds up to 54 Mbps in the 5 GHz radio frequency spectrum.

Advantageously, WiFi can facilitate a quick and effective way of providing a wireless extension to an existing LAN. To provide this wireless extension, one or more WiFi access points (APs) can connect to the connection ports either directly or through intermediate equipment, such as WiFi switch. After an AP is connected to a connection port, a user can access the LAN using a device (called a station) equipped with WiFi radio. The station can wirelessly communicate with the AP.

Wireless networks use radio signals for information transfer. The wireless medium is a shared transmission medium among multiple wireless devices in the network. The standards such as IEEE 802.11 MAC (Medium Access Control) provide protocol for arbitrating the use of shared wireless transmission medium among multiple wireless devices. Wireless networks have been highly successful.

A number of times undesirable wireless devices, however, can be present in the wireless networks (e.g. unwittingly, maliciously etc.). The wireless activity from the undesirable devices can have adverse impact on the operation of wireless network. For example, malicious wireless devices can launch denial of service (DOS) attack on the wireless network. The DOS attack is aimed at disrupting the wireless communication of authorized devices in the network. Since the radio signals can penetrate the physical structures such as the walls of a building, DOS attack can be launched from neighboring premises, streets, parking lot etc. Another example of undesirable devices is mis-configured wireless devices. Such devices can disrupt the wireless communication of other authorized devices in the network. These and other limitations are described throughout the present specification and more particularly below.

As the popularity of wireless networks grows and certain important computer applications begin to ride on wireless networks, disruption to wireless networks from undesirable devices is unacceptable. Therefore, a need arises for improving the security for wireless LAN environments.

BRIEF SUMMARY OF THE INVENTION

According to the present invention, techniques related to wireless computer networking are provided. More particularly, the invention provides methods and systems for restricting undesirable wireless activity in local area networks with wireless extensions. These methods and systems can be applied to many computer networking environments, e.g. environments based upon the IEEE 802.11 family of standards (WiFi) and others that use shared transmission medium.

The application of wireless communication to computer networking has introduced significant security risks. For example, the wireless medium is a shared transmission medium and its use needs to be arbitrated among multiple wireless devices in the network. However, presence of undesirable wireless devices in the network can disrupt the normal operation of the wireless network. These undesirable devices can be malicious and launch DOS attacks on the wireless networks. Since the radio signals can penetrate building structures such as walls, DOS attacks can even be launched by devices that are outside the region of wireless network operation such as streets, neighboring premises, parking lot etc. The undesirable devices can also be mis-configured devices that unintentionally cause harm to wireless network operation. Therefore, as computer networks with wireless extensions become more ubiquitous, users are increasingly concerned about undesirable wireless devices, whether within or outside the region of operation of the local area network.

In accordance with an aspect of the invention, methods and systems for wireless computer networking are provided which can restrict (e.g., selectively restrict) undesirable wireless activity. Moreover, the restricting is done while allowing selected wireless devices (e.g. authorized devices, compliant devices etc.) to communicate. As merely an example, the undesirable wireless activity can occur from malicious, misconfigured or unwitting wireless devices. In an embodiment, these methods and systems can be used to resist DOS attacks in wireless networks. For example, the DOS attacks include deauthentication or disassociation flood, authentication or association flood, premature EAP message flood, EAPOL start flood, EAPOL logoff flood, CTS flood, NAV attack, fake AP, AirJack, FataJack etc. In an alternative embodiment, these methods and systems can be used to block ad hoc wireless connections (e.g. unauthorized ad hoc wireless connections). Ad hoc connection is a peer-to-peer wireless connection between wireless devices such as laptops. In yet an alternative embodiment, the techniques of present invention can be used to block unauthorized APs in the wireless network.

In accordance with another aspect of the invention, a method for allowing one or more wireless devices to transmit wireless signals within a selected local geographic region while substantially preventing at least one other wireless device from transmitting wireless signals is provided. The method includes receiving an indication associated with an undesirable wireless activity. Preferably, the undesirable wireless activity is associated with at least the one other wireless device. The method includes transmitting over a wireless medium a first packet intended for a first selected device while at least the one other wireless device associated with the undesirable wireless activity receives at least a portion of the first packet. In a preferred embodiment, the first packet includes at least a first selected value in a duration field in the packet, to allow the first selected device to transmit a plurality of wireless signals for a first determined portion of time. In a specific embodiment, the portion of the first packet received by at least the one other wireless device causes at least the one other wireless device to be restricted from providing the undesirable wireless activity for at least a portion of time associated with the first selected value in the duration field of the first packet while the first selected device transmits the plurality of wireless signals for the first determined portion of time.

In an alternative specific embodiment, the present invention provides a system for allowing one or more wireless devices to transmit wireless signals within a selected local geographic region while substantially preventing at least one other wireless device from transmitting wireless signals. Preferably, the system comprises one or more computer memories that include various computer codes. One or more codes is directed to receiving an indication associated with an undesirable wireless activity, which is associated with at least the one other wireless device. The one or more memories include one or more codes directed to transmitting over a wireless medium a packet intended for a selected wireless device. The packet includes a selected value in a duration field, while at least the one other device receives at least a portion of the packet, after the indication associated with the undesirable wireless activity has been received, to allow the selected wireless device to transmit a plurality of wireless signals for a determined portion of time. Preferably, the portion of the packet causes the one other wireless device to be restricted from providing further undesirable wireless activity for at least a portion of time associated with the selected value in the duration field of the packet while the selected device transmits the plurality of wireless signals for the determined portion of time.

In yet an alternative specific embodiment, the present invention provides a method for arbitrating use of wireless medium for transmission of wireless signals within a selected local geographic region. The selected local geographic region comprises a first set of a plurality of devices to be allowed to transmit wireless signals and a second set of one or more devices to be substantially restricted from transmitting wireless signals. The method includes providing identity information associated with the first set of wireless devices. The method includes transmitting over a wireless medium at least one packet for each of the wireless devices in the first set. The at least one packet for each of the wireless devices includes an identity information, including an address, associated with that wireless device. That wireless device is a recipient of the one packet on the wireless medium. The at least one packet also has a selected value in a duration field of the one packet. The selected value is associated with a portion of time for which that wireless device is to be allowed to transmit wireless signals within the selected local geographic region while restricting at least the wireless devices in the second set.

Certain advantages and/or benefits may be achieved using the present invention. For example, the present technique provides an easy to use process that relies upon conventional computer hardware and software technologies. In some embodiments, the method and system can selectively restrict undesirable wireless activity, while allowing desirable wireless activity for a selected device for a predetermined portion of time. The selectively restricting enables authorized wireless devices to communicate, while undesirable wireless activity is being restricted according to a specific embodiment. The present technique can be used to resist DOS attacks, block unauthorized ad hoc connections, block unauthorized APs and so on according to certain embodiments. Depending upon the embodiment, one or more of these benefits may be achieved. These and other benefits will be described in more throughout the present specification and more particularly below.

DETAILED DESCRIPTION OF THE INVENTION

According to the present invention, techniques related to wireless computer networking are provided. More particularly, the invention provides methods and systems for restricting undesirable wireless activity in local area networks with wireless extensions. These methods and systems can be applied to many computer networking environments, e.g. environments based upon the IEEE 802.11 family of standards (WiFi) and others that use shared transmission medium.

The application of wireless communication to computer networking has introduced significant security risks. For example, the wireless medium is a shared transmission medium and its use needs to be arbitrated among multiple wireless devices in the network. However, presence of undesirable wireless devices in the network can disrupt the normal operation of the wireless network. These undesirable devices can be malicious and launch DOS attacks on the wireless networks. Since the radio signals can penetrate building structures such as walls, DOS attacks can even be launched by devices that are outside the region of wireless network operation such as streets, neighboring premises, parking lot etc. The undesirable devices can also be mis-configured devices that unintentionally cause harm to wireless network operation. Unauthorized ah hoc connections and unauthorized access points also pose security threats to wireless networks. Therefore, as computer networks with wireless extensions become more ubiquitous, users are increasingly concerned about unauthorized wireless devices, whether within or outside the region of operation of the local area network.

Figure 1:
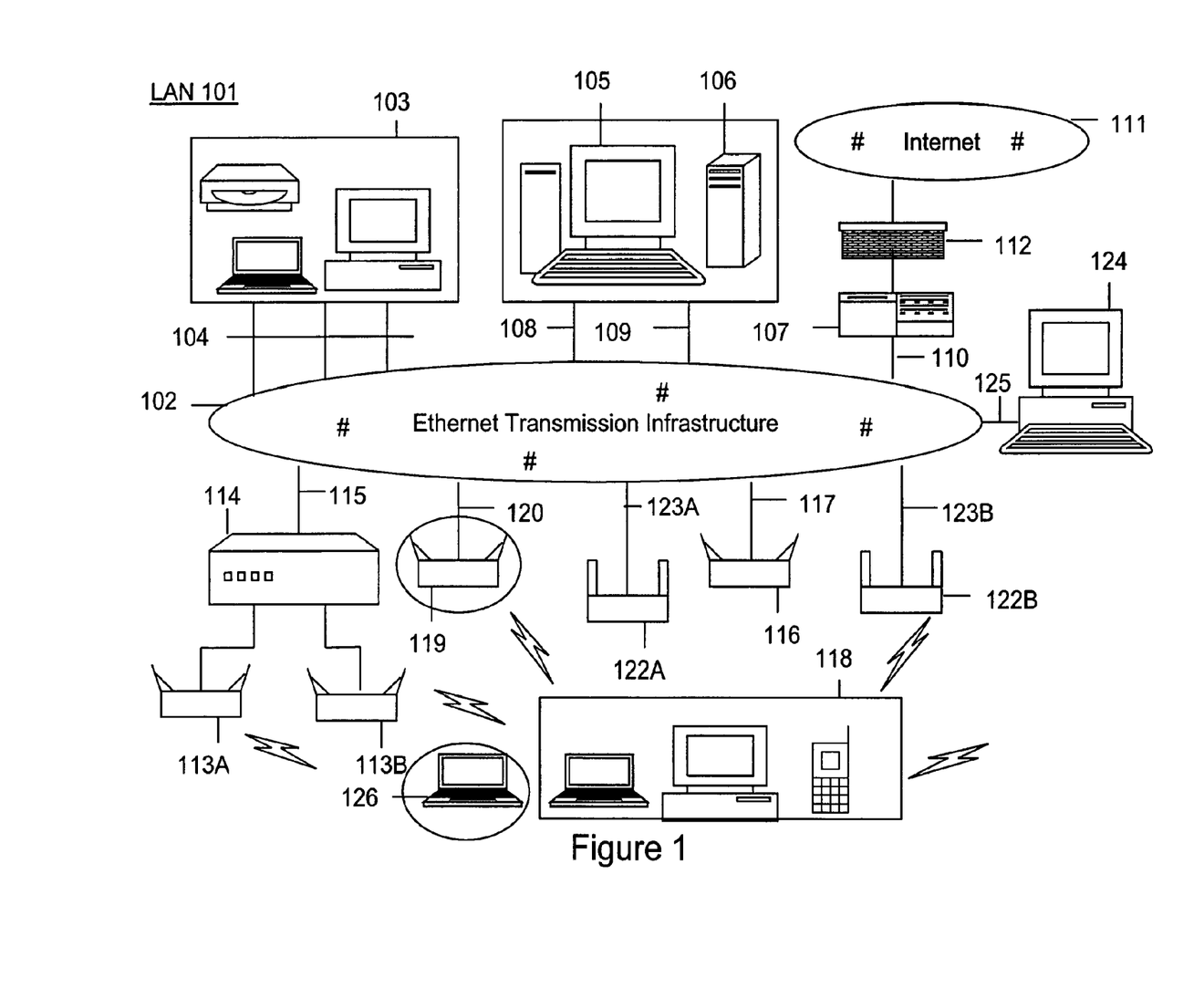
FIG. 1 illustrates a simplified LAN architecture that can facilitate restricting undesirable wireless activity according to an embodiment of the present invention.

FIG. 1 illustrates a simplified local area network (LAN) 101 that can facilitate restricting undesirable wireless activity. This diagram is merely an example, which should not unduly limit the scope of the claims herein. One of ordinary skill in the art would recognize many variations, modifications, and alternatives. In LAN 101, a core transmission infrastructure 102 can include various transmission components, e.g. Ethernet cables, hubs, and switches. In a typical deployment, the core transmission infrastructure 102 comprises one or more network segments.

According to one embodiment, a network segment refers to an IP "subnetwork" (called "subnet"). Each subnet is identified by a network number (e.g. IP number and subnet mask) and plurality of subnets are interconnected using router devices. Notably, the plurality of subnets of the LAN 101 can be geographically distributed (e.g. in offices of a company in different geographic locations). The geographically distributed segments are interconnected via virtual private network (VPN).

One or more connection ports (e.g. Ethernet sockets) are provided on each of the segments for connecting various computer systems to the LAN 101. Thus, one or more end user devices 103 (such as desktop computers, notebook computers, telemetry sensors etc.) can be connected to LAN 101 via one or more connection ports 104 using wires (e.g. Ethernet cables) or other suitable connection means.

Other computer systems that provide specific functionalities and services can also be connected to LAN 101. For example, one or more database computers 105 (e.g. computers storing customer accounts, inventory, employee accounts, financial information, etc.) may be connected to LAN 101 via one or more connection ports 108. Additionally, one or more server computers 106 (computers providing services, such as database access, email storage, HTTP proxy service, DHCP service, SIP service, authentication, network management etc.) may be connected to LAN 101 via one or more connection ports 109.

In this embodiment, a router 107 can be connected to LAN 101 via a connection port 110. Router 107 can act as a gateway between LAN 101 and the Internet 111. Note that a firewall/VPN gateway 112 can be used to connect router 107 to the Internet 111, thereby protecting computer systems in LAN 101 against hacking attacks from the Internet 111 as well as enabling remote secure access to LAN 101.

In this embodiment, a wireless extension of LAN 101 is also provided. For example, authorized APs 113A and 113B can be connected to LAN 101 via a switch 114. Switch 114 in turn can be connected to a connection port 115. Switch 114 can assist APs 113A and 113B in performing certain complex procedures (e.g. procedures for authentication, encryption, QoS, mobility, firewall etc.) as well as provide centralized management functionality for APs 113A and 113B. Note that an authorized AP 116 can also be directly connected to LAN 101 via a connection port 117. In this case, AP 116 may perform necessary security procedures (such as authentication, encryption, firewall, etc.) itself.

In this configuration, one or more end user devices 118 (such as desktop computers, laptop computers, handheld computers, PDAs, etc.) equipped with radio communication capability can wirelessly connect to LAN 101 via authorized APs 113A, 113B, and 116. Notably, authorized APs connected to the LAN 101 provide wireless connection points on the LAN. Note that WiFi or another type of wireless network format (e.g. UWB, WiMax, Bluetooth, etc.) can be used to provide the wireless protocols.

As shown in FIG. 1, an undesirable wireless station 126 can disrupt the operation of wireless network comprising authorized APs and authorized end user devices. Such station can be operating from within or from outside of the selected geographic region of LAN operation. For example, the station 126 can launch wireless DOS attack. Examples of some DOS attacks are deauthentication or disassociation flood, authentication or association flood, NAV field based virtual jamming, CTS flood, EAP message flood, PS Poll flood, fake AP etc. Many software tools for launching DOS attacks on wireless networks are now freely available on the Internet. Examples are airjack, wlanjack, Void 11 etc. The DOS attacks on wireless network can cause serious network disruption such as inhibiting wireless clients from connecting to APs, preventing wireless medium access to authorized users, crash the APs in the wireless network etc.

As another example, the station 126 can form unauthorized ah hoc wireless connection with one of the authorized devices 118. The station 126 can then compromise the integrity of the authorized device and can even gain unauthorized access to the LAN through the authorized device.

In one embodiment, one or more of the authorized stations 118 and/or one or more of the authorized APs 113A, 113B and 116 can be mis-configured. Mis-configured wireless devices can generate undesirable wireless activity such as unfairly accessing the wireless medium, transmitting too much data on the wireless medium and so on.

In another embodiment, rogue AP 119 can be connected to the LAN. In one embodiment, rogue AP can be an unauthorized AP. The rogue AP may not deploy the right security policies. Unauthorized users can connect to the LAN 101 using the radio signal of the rogue AP that spills outside the authorized region of operation of the LAN.

In accordance with one aspect of the invention, a security monitoring system can protect LAN 101 from any type of undesirable wireless activity (e.g. DOS attack, mis-configured wireless devices, unauthorized ad hoc connection, rogue AP etc.). The security monitoring system can include one or more RF sensor devices (e.g. sensor devices 122A and 122B, each generically referenced herein as a sniffer 122) disposed within or in a vicinity of a selected geographic region comprising LAN 101. In one embodiment (shown in FIG. 1), sniffer 122 can be connected to LAN 101 via a connection port (e.g. connection port 123A/123B). In another embodiment, sniffer 122 can be connected to LAN 101 using a wireless connection.

In one embodiment, a sniffer 122 is able to monitor wireless activity in a subset of the selected geographic region. Wireless activity can include any transmission of control, management, or data packets between an AP and one or more wireless stations, or among one or more wireless stations. Wireless activity can even include communication for establishing a wireless connection between an AP and a wireless station (called "association").

In general, sniffer 122 can listen to a radio channel and capture transmissions on that channel. In one embodiment, sniffer 122 can cycle through multiple radio channels on which wireless communication could take place. On each radio channel, sniffer 122 can wait and listen for any ongoing transmission. In one embodiment, sniffer 122 can operate on multiple radio channels simultaneously.

Whenever a transmission is detected, sniffer 122 can collect and record the relevant information about that transmission. This information can include all or a subset of information gathered from various fields in a captured packet. In another embodiment, a receive signal strength indicator (RSSI) associated with the captured packet can also be recorded. Other information such as the day and the time the transmission was detected can also be recorded. The information collected by one or more sniffers can be used to detect undesirable wireless activity within or in the vicinity of the selected geographic region.

A sniffer 122 can transmit packets over the wireless medium. These packet transmissions can facilitate restricting of the detected undesirable wireless activity according to an aspect of the present invention.

Figure 2:
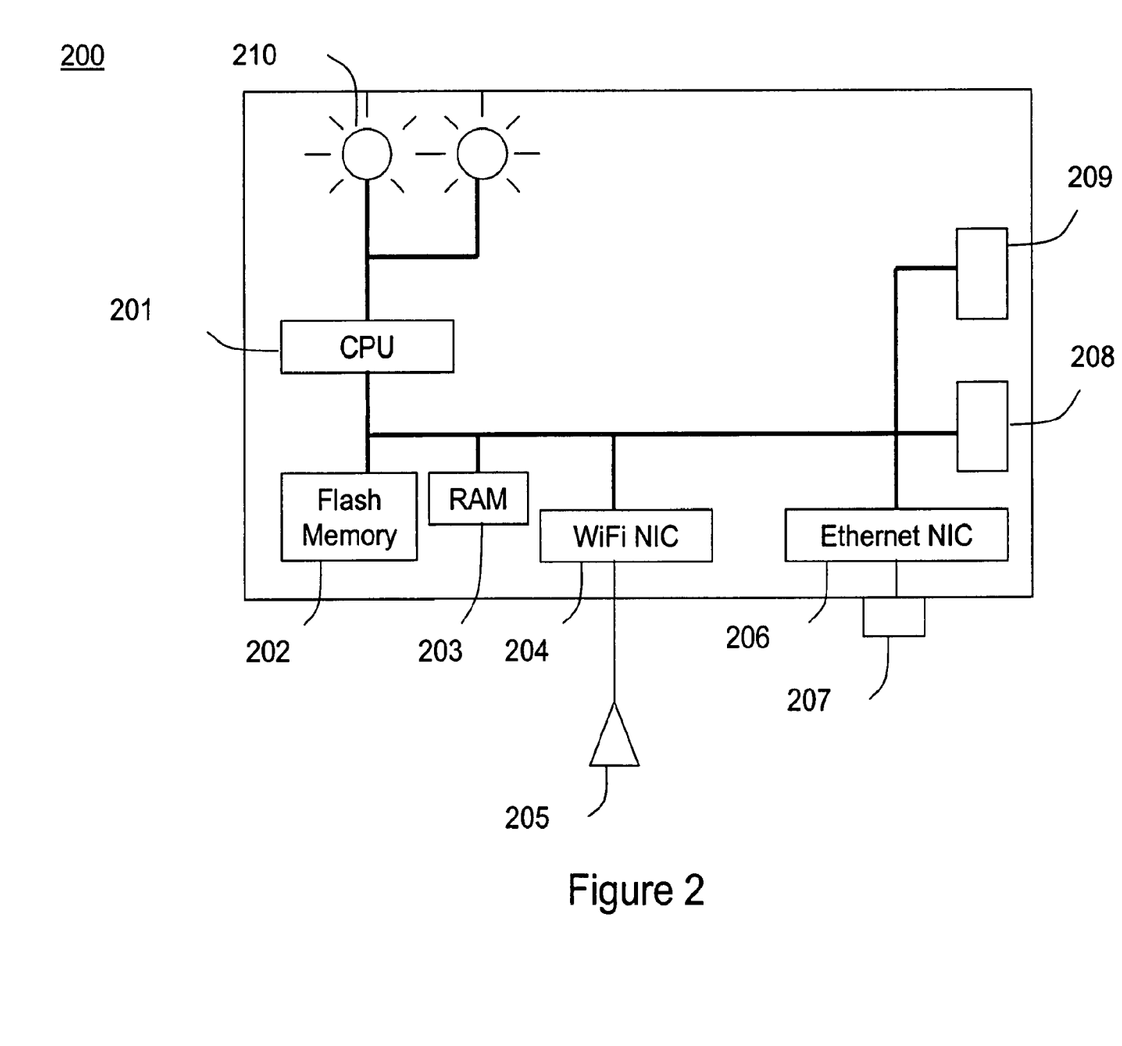
FIG. 2 illustrates a simplified exemplary sniffer device architecture according to an embodiment of the present invention.

An exemplary hardware diagram of the sniffer is shown in FIG. 2. This diagram is merely an example, which should not unduly limit the scope of the claims herein. One of ordinary skill in the art would recognize many variations, alternatives, and modifications. As shown, sniffer 122 can have a central processing unit (CPU) 201, a flash memory 202 where the software code for sniffer functionality resides, and a RAM 203 which serves as volatile memory during program execution. The sniffer 122 can have one or more 802.11 wireless network interface cards (NICs) 204 which perform radio and wireless MAC layer functionality and one or more of dual-band (i.e., for transmission detection in both the 2.4 GHz and 5 GHz radio frequency spectrums) antennas 205 coupled to the wireless NICs. Each of the wireless NICs 204 can operate in a, b, g, b/g or a/b/g mode. Moreover, the sniffer 122 can have an Ethernet NIC 206 which performs Ethernet physical and MAC layer functions, an Ethernet jack 207 such as RJ-45 socket coupled to the Ethernet NIC for connecting the sniffer device to wired LAN with optional power over Ethernet or POE, and a serial port 208 which can be used to flash/configure/troubleshoot the sniffer device. A power input 209 is also provided. One or more light emitting diodes (LEDs) 210 can be provided on the sniffer device to convey visual indications (such as device working properly, error condition, undesirable wireless activity alert, and so on).

In one embodiment, sniffer 122 can be built using a hardware platform similar to that used to build an AP, although having different functionality and software. In one embodiment, both the sniffer and the AP functionality can be provided in the same hardware platform. In another embodiment, the sniffer functionality is provided as software that is run on one or more computers in the wireless network.

Server 124 (also called "security appliance") can be coupled to LAN 101 using a connection port 125. In one embodiment, each sniffer 122 can convey its information about detected wireless activity to server 124 (i.e., over one or more computer networks). Server 124 can then analyze that information, store the results of that analysis, and process the results. In another embodiment, sniffer 122 may filter and/or summarize its information before conveying it to server 124. Sniffer 122 may also receive specific instructions from server 124, e.g. tuning to specific radio channel, detecting transmission of specific packets on a radio channel, indication about undesirable wireless activity etc. In an alternative embodiment, the sniffer 122 can operate as a standalone device without having to communicate with the server.

According to a specific embodiment, the present invention provides a method for restricting undesirable wireless activity in LAN 101. Moreover, while undesirable wireless activity is being restricted, selected wireless devices (e.g. authorized devices, compliant devices etc.) are allowed to communicate. The method can be implemented by transmitting selected packets over the wireless medium using one or more sniffers 122. The method makes use of "virtual carrier sensing" mechanism in 802.11 MAC protocol in a novel fashion.

Virtual carrier sensing: The wireless medium is a shared transmission medium. Its use needs to be arbitrated among different wireless devices in the network. The IEEE 802.11 MAC standard specifies two types of carrier sense mechanism for this: physical carrier sensing and virtual carrier sensing. In the physical carrier sensing, the wireless station listens to the radio channel to detect if a transmission is occurring and if so, waits for the ongoing transmission to complete before attempting new transmission. The virtual carrier sensing is based on the "duration" field in the transmitted packets. According to IEEE 802.11 standard, duration field is a 2-byte field that appears between the 'frame control' field and the 'addresses' field. This field can be used by a first station (transmitter) to reserve the wireless medium for a certain amount of time for data transmission to a second station (receiver). For this, the transmitter includes a selected value in the duration field of a packet and transmits the packet over the wireless medium to the receiver, i.e., includes the MAC address of the receiver in the address field immediately following the duration field (called 'Address 1' field in the IEEE 802.11 standard). Any other station that listens to this packet, refrains from transmitting for the amount of time computed based on the value in the duration field.

Figure 3A:
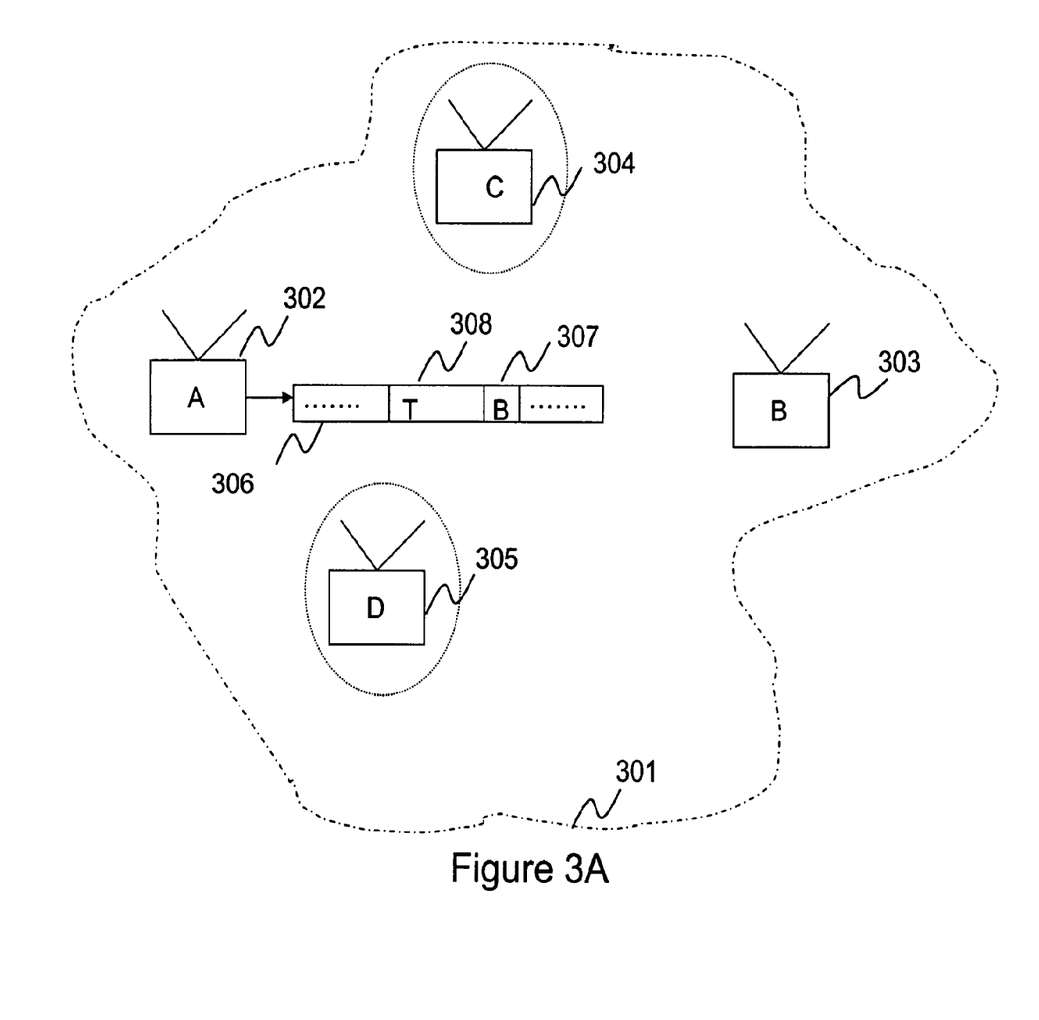
FIG. 3A illustrates certain principle of virtual carrier sensing according to an embodiment of the present invention.

The principle of virtual carrier sensing is illustrated in FIG. 3A. This diagram is merely an example, which should not unduly limit the scope of the claims herein. One of ordinary skill in the art would recognize many variations, modifications, and alternatives. As shown, station A (302) transmits an IEEE 802.11 type packet (306) over the wireless medium 301 destined to station B (303). The receiver MAC address field (307) in packet 306 has the MAC address of station B in it. The station A also includes a selected value T (e.g. 314 microseconds, 258 microseconds, 1 millisecond) in the duration field (308) of the packet 306 in order to reserve the wireless medium for certain amount of time. The stations C (304) and D (305) which receive this packet over the wireless medium defer their transmission depending upon value in the duration field 308. In one preferred embodiment, the station A reserves the wireless medium for transmission of acknowledgement (ACK) to packet 306 from B to A, using duration field in the packet 306. In another preferred embodiment (e.g., when packet fragmentation is used), the station A reserves the wireless medium for transmission of acknowledgement (ACK) to packet 306 from B to A, as well as for transmission of subsequent packet (not shown in FIG. 3B) from A to B and its ACK from B to A, using duration field in the packet 306. In yet another preferred embodiment, the packet 306 is an RTS (Request To Send) packet that is directed to reserve wireless medium for transmission of packets from A to B and, if applicable, their ACKs from B to A, using duration field.

Figure 3B:
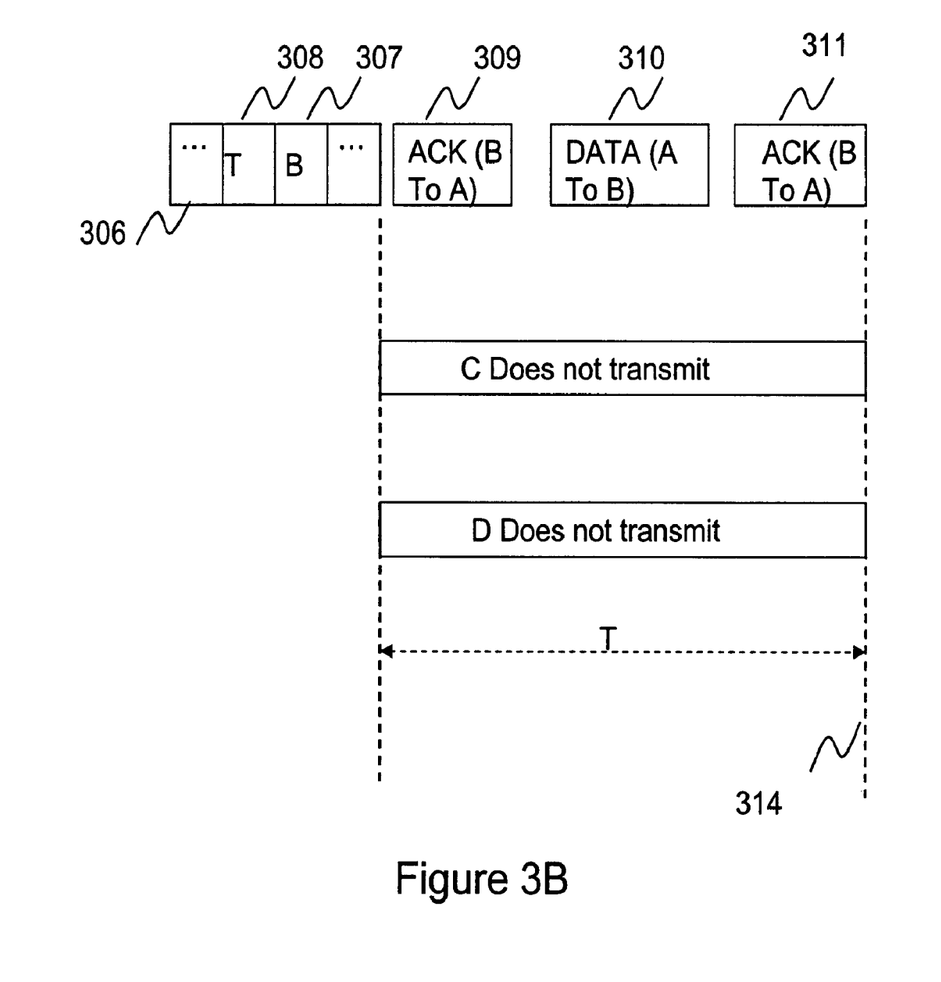
FIG. 3B is another simplified-illustration of the principle of virtual carrier sensing according to an embodiment of the present invention.

Another illustration of the principle of virtual carrier sensing is provided in FIG. 3B. As shown, a value (T) in the duration field (308) of packet 306 causes stations C and D to defer their wireless transmissions at least until time instant 314. Until this time instant, station A transmits one or more data packets 310 to station B over the wireless medium, and station B may send acknowledgements 311 for data packets 310 to station A. Packet 309 is an acknowledgement from station B to A for packet 306.

The method of present invention (which is referred hereinafter as "selective virtual jamming") makes use of virtual carrier sensing mechanism in a novel way to selectively restrict undesirable wireless activity. We make an important observation that the intended recipient of the packet in 802.11 protocol does not need to defer transmission based on the duration field in the packet. For example, if a packet is transmitted over the wireless medium by station A with the receiver MAC address of station B in it, any other station C that receives this packet defers its transmission by an amount of time based on the duration value in the packet, while station B which is its intended recipient does not do so. This observation applies to a large number of 802.11 compliant WiFi equipment (APs, client cards etc.), while only a small number of implementations (e.g. buggy, non-standard etc.) are exceptions. This observation is leveraged in selective virtual jamming process as described below.

Figure 4:
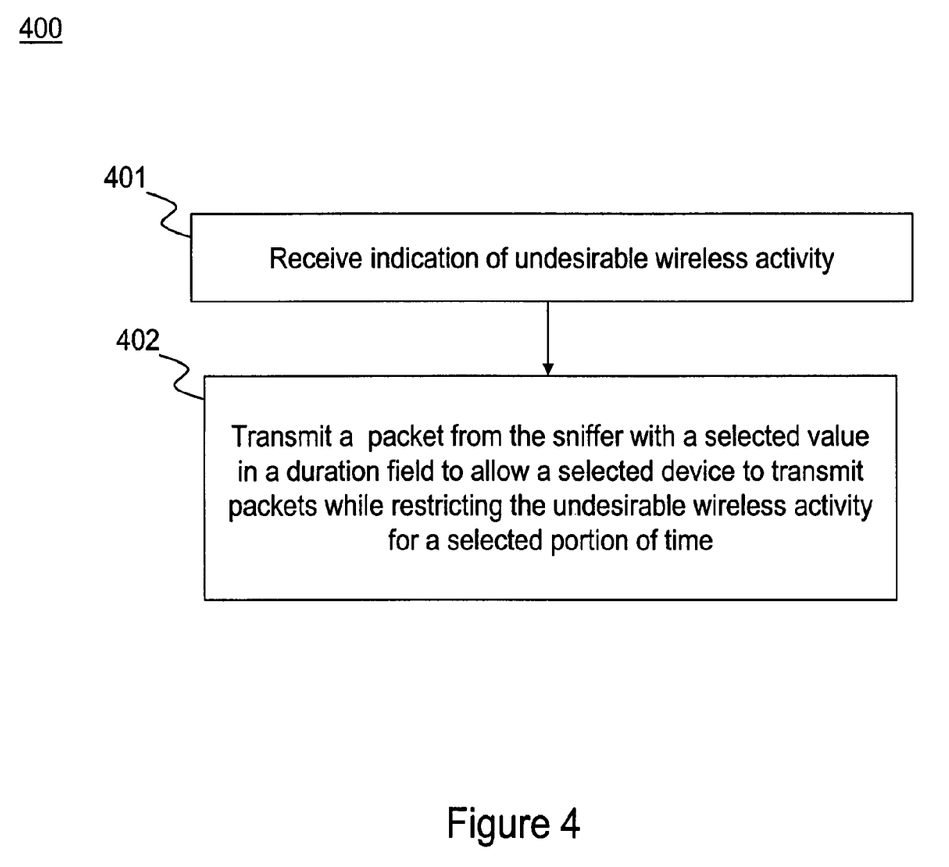
FIG. 4 is a simplified illustration of a method for allowing wireless transmission of selected devices in wireless network while restricting undesirable wireless activity according to an embodiment of the present invention.

The selective virtual jamming method 400 is illustrated in FIG. 4. This diagram is merely an example, which should not unduly limit the scope of the claims herein. One of ordinary skill in the art would recognize many variations, modifications, and alternatives. The various steps in the method 400 are as follows. Of course, steps be added, removed, or interchanged without departing from the spirit of present invention.

As shown, step 401 can receive an indication associated with an undesirable wireless activity. For example, the undesirable wireless activity can be a DOS attack. As other examples it can be an unauthorized ad hoc connection or a rogue AP. As yet another example, the undesirable wireless activity can be associated with a mis-configured wireless device.

In one embodiment, the indication can be sent by the server 124 and received by the sniffer 122. In an alternative embodiment, the indication can be sent from one portion of computer program and received by another portion of computer program inside the sniffer 122.

In one embodiment, the indication comprises information associated with the identities of the wireless devices associated with the undesirable wireless activity (for example, MAC address of the device involved in ad hoc wireless connection, MAC address of mis-configured wireless device etc.). In another embodiment, the indication comprises information associated with the identities of wireless devices that are affected from the undesirable wireless activity (for example, identities of authorized devices that operate on the same radio channel in which undesirable wireless activity such as DOS attack is present). In yet another embodiment, the indication comprises information associated with the identities of wireless devices that are to be allowed to transmit wireless signals. The objective of selected virtual jamming is to enable wireless transmission of selected devices (e.g. authorized or compliant devices) while restricting the devices that are associated with the undesirable wireless activity, even in embodiments where the identities of such devices providing the undesirable wireless activity are not known.

For this, step 402 can transmit over a wireless medium a packet (also called 'frame') intended for a selected device. In the preferred embodiment, the selected device is an authorized wireless device in the network, e.g. AP 113A, 113B, or 116, one of the wireless stations 118 etc. In one embodiment, the packet is transmitted by the sniffer 122. The packet is preferably in the IEEE 802.11 wireless local area network standard format. The packet comprises a duration field. The value in the duration filed of this packet is preferably chosen so as to allow the selected device to transmit wireless signals for certain duration of time while restricting the devices that are associated with the undesirable wireless activity. These devices receive at least a portion of the packet, the portion comprising the duration field, and defer transmission of wireless signals for a portion of time computed based on the value of the duration field in the packet. The selected wireless device however does not defer transmission of wireless signals based on the value in the duration field and thus gets opportunity to transmit.

Conventionally, the duration field in IEEE 802.11 packets is used by the transmitter of the packet to reserve the wireless medium for transmission of acknowledgement (ACK) from the receiver. Alternately, the duration field is used by the transmitter of the packet to reserve the wireless medium for transmission of data from the transmitter to the receiver. For example, the transmitter device A can send RTS (Request To Send) message over the wireless medium including a duration field indicative of desired reservation time over the wireless medium to the intended recipient B. The recipient B replies to A with CTS (Clear To Send) message over the wireless medium that includes duration field indicative of the same desired reservation time. All other wireless devices that receive RTS and/or CTS messages, defer their transmission for an amount of time indicated by the duration fields in these messages. During this time, the transmitter A sends data to the receiver B and the receiver B may send acknowledgements (ACKs) to the transmitter A. Similarly, when multiple data fragments are to be transmitted from A to B, A can include duration field in a data fragment in order to reserve the wireless medium for the subsequent data fragment. B can send acknowledgements to A for one or more of these data fragments.

In contrast, in selective virtual jamming, the sniffer 122 (acting as transmitter) sends a packet to other wireless device (acting as recipient) and includes a selected value in the duration field of the packet in order to reserve the wireless medium for data transmission of the other wireless device (recipient). Also, during the reserved transmission time, the other wireless device usually transmits data to yet other wireless devices. The packet transmitted by the sniffer is preferably a data packet or a management packet in accordance with IEEE 802.11 MAC protocol, but it can also be a control packet.

Figure 5:
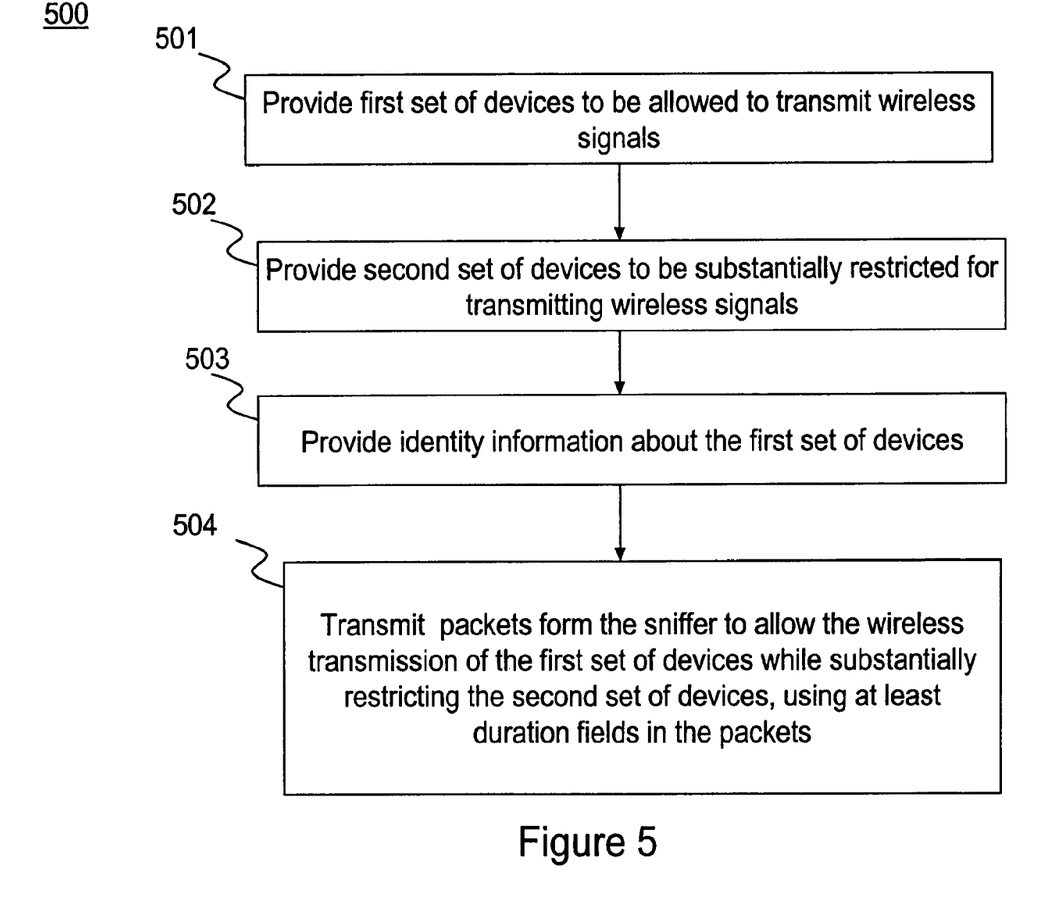
FIG. 5 is a simplified illustration of a method for arbitrating use of wireless medium among a first set of devices for transmission of wireless signals while restricting a second set of devices from transmitting wireless signals according to an embodiment of the present invention.

In one preferred embodiment of the present invention, the sniffer can schedule transmission opportunities among a plurality of selected wireless devices while restricting the devices associated with an undesirable wireless activity. A method 500 according to this embodiment is illustrated in FIG. 5. This diagram is merely an example, which should not unduly limit the scope of the claims herein. One of ordinary skill in the art would recognize many variations, modifications, and alternatives. The various steps in the method 500 are as follows. Of course, steps be added, removed, or interchanged without departing from the spirit of present invention.

As shown, step 501 can provide a first set of wireless devices. Preferably, the first set of devices are authorized devices or compliant devices which are to be allowed to transmit wireless signal within a selected local geographic region such as region of operation of LAN 101, e.g. office space, floors, campus etc.

Step 502 can provide a second set of wireless devices. Preferably, the second set of devices are associated with undesirable wireless activity within the selected local geographic region. The second set of devices are to be substantially restricted from transmitting wireless signals within the selected local geographic region. Preferably, the first set of wireless devices and the second set of wireless devices are compliant with IEEE 802.11 wireless local area network standard.

Step 503 can provide identity information associated with the first set of devices. In one embodiment, the identity information is provided within the sniffer 122. In one embodiment, the identity information is provided by the server 124 to the sniffer 122. Depending upon the embodiment, identity information associated with the second set of devices may or may not be provided. The identity information preferably comprises wireless MAC addresses of the devices in the first set.

Step 504 can then schedule transmission opportunities among the first set of devices. For this, at least one packet is transmitted to each of the devices in the first set. The packet transmitted to any selected device in the first set includes an identity information (e.g. MAC address) associated with that selected device as an address of a recipient of the packet on the wireless medium. Moreover, the packet includes a selected value in a duration field of the packet. At least a portion of this packet, the portion including the duration field, is received by the devices in the second set over the wireless medium. The second set of devices defer transmission of wireless signals for a duration of time computed based on the selected value in the duration field of the packet. The selected wireless device on the other hand does not defer transmission of wireless signals. Thus the selected wireless device gets opportunity to transmit packets to other wireless devices, while the devices in the second set are being restricted from transmitting wireless signals.

In one embodiment, the sniffer 122 transmits packets to devices in the first set to schedule transmission opportunities for them. The transmission opportunities can be scheduled using one or more scheduling schemes including, but not limited to, round robin, weighted round robin, weighted fair queuing, policy based scheduling, application based scheduling and like. In one embodiment, the sniffer 122 transmits packets with the MAC address of itself in the source address field of the packets. In another embodiment, the sniffer 122 transmits packets with one or more arbitrary MAC addresses in the source address fields of the packets. In one embodiment, the sniffer 122 can be combined with AP functionality. In this embodiment, the sniffer can include a selected value in a duration field of the packet that is anyway to be transmitted to a selected wireless device (e.g. authorized client), in order to schedule transmission opportunity for that device. Alternatively, the sniffer can generate new packet for a selected wireless device and include a selected value in the duration field of this packet, in order to schedule transmission opportunity for that device.

Figure 6A:
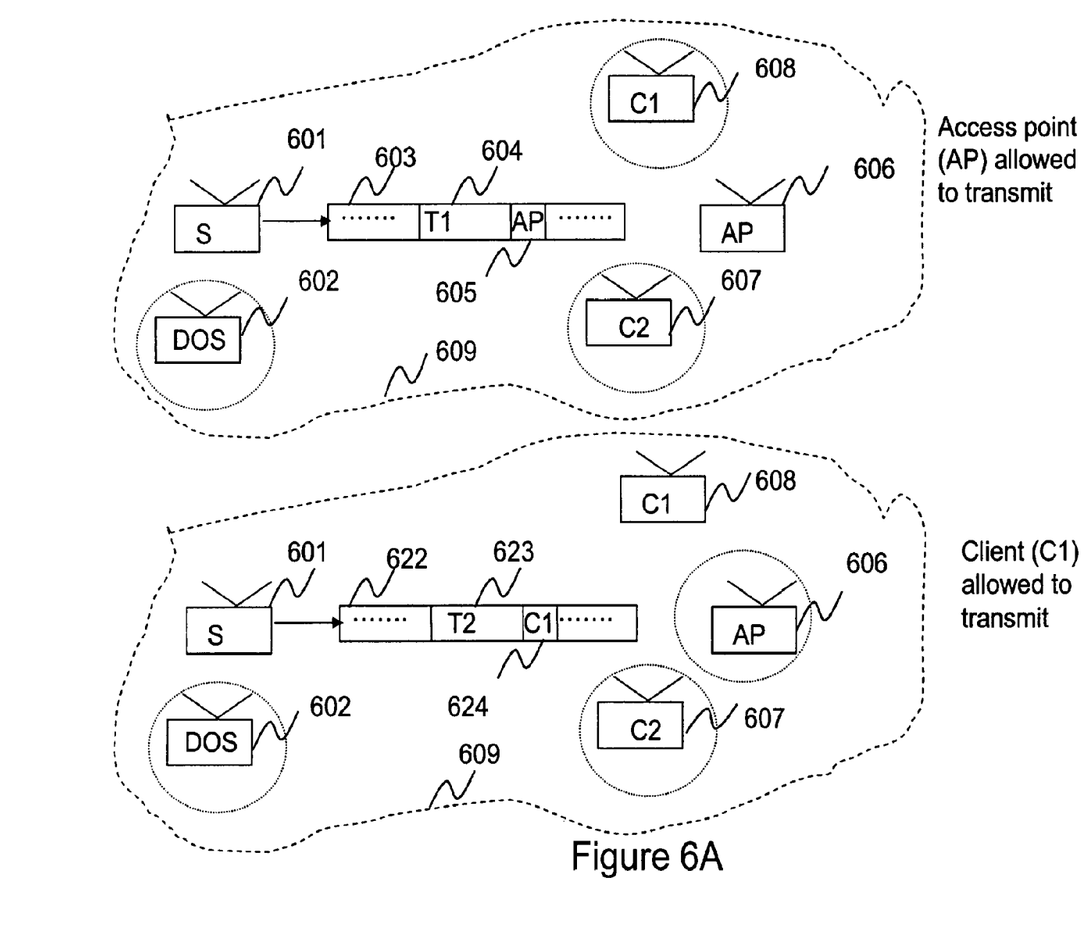
FIG. 6A is a simplified illustration of the principle of selective virtual jamming according to an embodiment of the present invention.
Figure 6B:
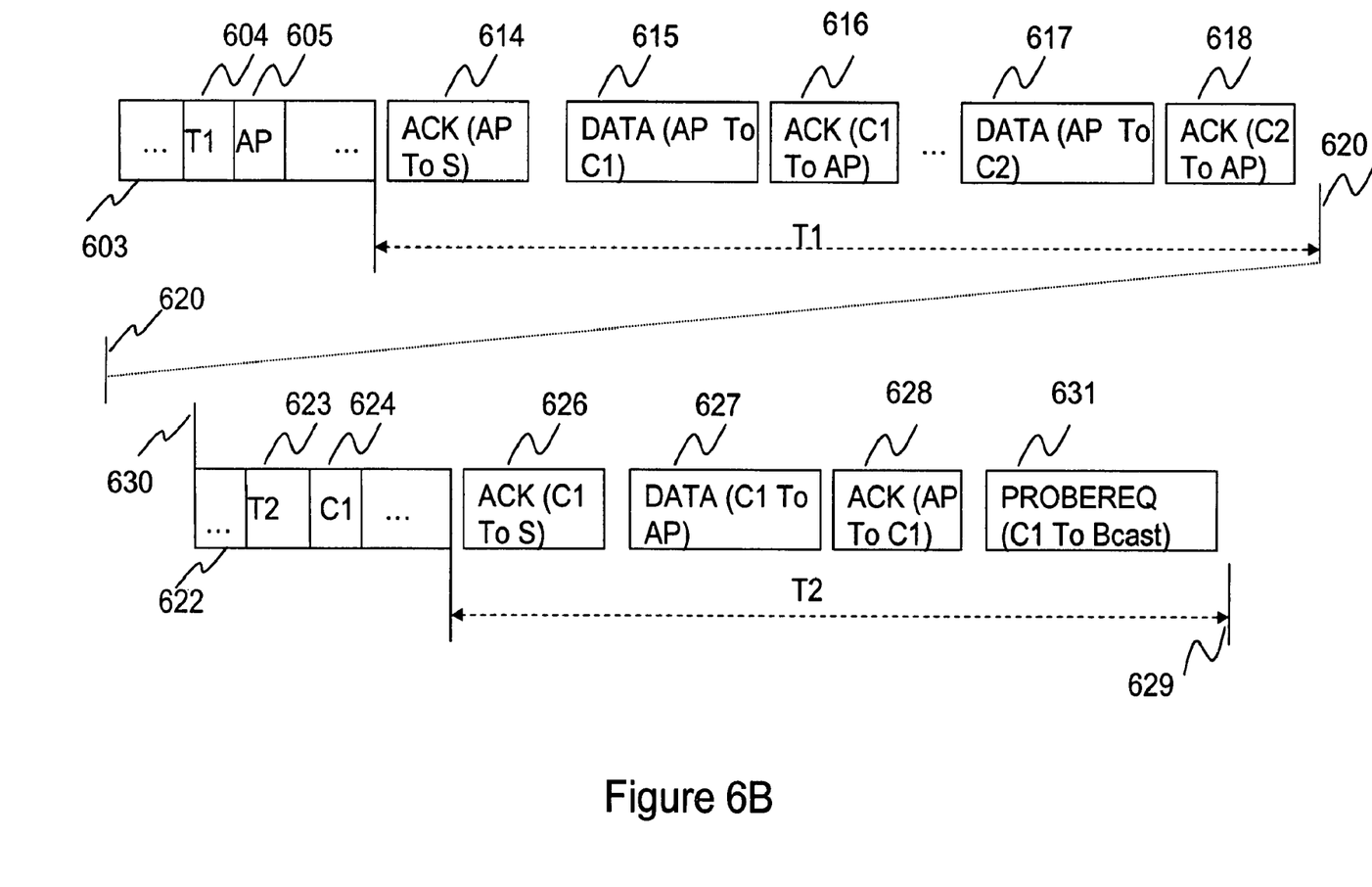
FIG. 6B is another simplified illustration of the principle of selective virtual jamming according to an embodiment of the present invention.

The principle of selective virtual jamming is illustrated in FIGS. 6A and 6B. These diagrams are merely examples, which should not unduly limit the scope of the claims herein. One of ordinary skill in the art would recognize many variations, modifications, and alternatives. As shown in FIG. 6A, an AP (606) and client wireless devices C1 (608) and C2 (607) operate over a wireless medium 609. A device 602 (DOS) generates a DOS attack in the wireless medium 609. Preferably, the device 602 operates on the same or one of the adjacent radio channels as devices AP, C1 and C2. A sniffer S (601) performs selective virtual jamming process to contain this DOS attack.

The sniffer sends a packet 603 with the MAC address of AP in the receiver address field 605 of the packet and a selected value T1 (e.g. 30 milliseconds) in the duration field 604 of the packet. Consequently, the devices C1, C2 and DOS defer their wireless transmissions for the duration of time associated with the value in the duration field 604 of the packet 603. The device 606 (AP) however being the intended recipient of the packet 603 does not defer wireless transmission based on the duration field 604. The device 606 thus gets opportunity to transmit for the duration of time associated with the value in the duration field 604. As shown in FIG. 6B, the device AP gets an opportunity to transmit until time instant 620 while other wireless devices (C1, C2 and DOS) defer their wireless transmission until this time instant. The device AP sends acknowledgement (614) for packet 603 to the sniffer 601 (S). Subsequent to this acknowledgment, device AP sends packet 615 to some wireless device (e.g. to client device C1). This wireless device C1 may send acknowledgement (616) for packet 615 to device AP. One or more packets 617 may follow from AP to other wireless devices (e.g. C2) which may in turn be acknowledged (618) by the receiving devices. Depending upon the embodiment any packet transmitted by the AP subsequent to the acknowledgement 614 and until time instant 620, can be an IEEE 802.11 type data packet, an IEEE 802.11 type management packet (e.g. beacon packet, deauthentication packet etc.), or an IEEE 802.11 type control packet (e.g. RTS packet). Moreover depending upon the embodiment any packet transmitted by the AP subsequent to the acknowledgement 614 and until time instant 620, can be a unicast packet, a broadcast packet or a multicast packet. The broadcast and multicast packets typically are not acknowledged by the recipients of the packets.

The sniffer may send another packet (not shown in FIG. 6A or 6B) to device 606 (AP), preferably around the time instant 620 when the deferring of transmission by C1, C2 and DOS from the duration value in packet 603 is due to come to end, if more transmission opportunity is to be given to AP.

Alternatively, as shown in FIG. 6A, the sniffer may send a packet (622) with the MAC address of another device (e.g. device C1) in the receiver address field 624 of the packet and a selected value T2 (e.g. 25 milliseconds) in the duration field 623 of the packet. Consequently, the device C1 gets an opportunity to transmit while the other devices (AP, C2 and DOS) are restricted. This is also illustrated in FIG. 6B. As shown, the sniffer S sends packet 622 with the MAC address of C1 in the receiver MAC address field (624) of the packet, starting time instant 630. Depending upon the embodiment, time instant 630 can be before, at or after the time instant 620. Based on the value of duration field 623 in packet 622, the wireless medium is reserved for device C1 until time instant 629. The device C1 sends acknowledgement 626 to the sniffer S for packet 622, and subsequently sends packet 627 to some wireless device (e.g. AP). The AP may send acknowledgment 628 for this packet (627) to the C1. As shown, the device C1 then transmits a probe request packet (631) which is addressed to a broadcast address. Depending upon the embodiment any packet transmitted by the C1 subsequent to the acknowledgement 626 and until time instant 629, can be an IEEE 802.11 type data packet, an IEEE 802.11 type management packet (e.g. probe request packet, deauthentication packet, association request packet etc.), or an IEEE 802.11 type control packet (e.g. RTS packet, PS-Poll packet etc.). Moreover depending upon the embodiment any packet transmitted by the C1 subsequent to the acknowledgement 626 and until time instant 629, can be a unicast packet, a broadcast packet or a multicast packet. The broadcast and multicast packets typically are not acknowledged by the recipients of the packets. In an alternative embodiment, the device for which the wireless medium is reserved via duration field (i.e. C1) may not transmit any data during the reserved time (e.g. time interval T2), if it does not have anything to transmit.

The sniffer can schedule transmission opportunities among stations C1, C2 and AP using any selected scheduling scheme such as round robin, weighted round robin, weighted fair queuing, policy based scheduling, application based scheduling and like. Preferably the transmission opportunity is not give to device 602 so that DOS attack is mitigated.

The various embodiments may be implemented as part of a computer system. The computer system may include a computer, an input device, a display unit, and an interface, for example, for accessing the Internet. The computer may include a microprocessor. The microprocessor may be connected to a data bus. The computer may also include a memory. The memory may include Random Access Memory (RAM) and Read Only Memory (ROM). The computer system may further include a storage device, which may be a hard disk drive or a removable storage drive such as a floppy disk drive, optical disk drive, jump drive and the like. The storage device can also be other similar means for loading computer programs or other instructions into the computer system.

As used herein, the term 'computer' may include any processor-based or microprocessor-based system including systems using microcontrollers, digital signal processors (DSP), reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term 'computer'. The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms 'software' and 'firmware' are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for arbitrating use of wireless medium for transmission of wireless signals within a selected local geographic region, the selected local geographic region comprising a first set of a plurality of wireless devices to be allowed to transmit wireless signals and a second set of one or more wireless devices to be substantially restricted from transmitting wireless signals, the method comprising:
   providing identity information associated with the first set of the plurality of wireless devices; and
   transmitting over a wireless medium at least one packet for each of the plurality of wireless devices in the first set, the at least one packet for the each of the wireless devices including
      an identity information, including an address, associated with that wireless device, that wireless device being a recipient of the one packet on the wireless medium, and
      a selected value in a duration field of the one packet, the selected value being associated with a portion of time for which that wireless device is to be allowed to transmit wireless signals within the selected local geographic region while restricting at least the wireless devices in the second set from transmitting wireless signals.

2. The method of claim 1 wherein each of the wireless devices in the second set is associated with one or more undesirable wireless activities within the selected local geographic region.

3. The method of claim 2 wherein the one or more undesirable wireless activities include a DOS (denial of service) attack.

4. The method of claim 2 wherein the one or more undesirable wireless activities include an ad hoc wireless connection.

5. The method of claim 1 wherein the first set of the plurality of wireless devices comprises a plurality of authorized wireless devices.

6. The method of claim 1 wherein the address comprises a MAC (medium access control) address of that wireless device in the first set.

7. The method of claim 1 wherein the first set of wireless devices and the second set of wireless devices are operative over a same radio channel, the same radio channel being a selected frequency.

8. The method of claim 1 wherein at least each of the wireless devices in the second set receives at least a portion of the one packet, the portion comprising the duration filed in the one packet.

9. The method of claim 8 wherein at least the each of the wireless devices in the second set restricts transmission of wireless signals for the portion of time.

10. The method of claim 1 wherein that wireless device in the first set receives the one packet and transmits an acknowledgement to the one packet over the wireless medium during the portion of time.

11. The method of claim 10 wherein that wireless device in the first set transmits one or more packets over the wireless medium to one or more wireless devices subsequent to the acknowledgement during the portion of time.

12. The method of claim 11 wherein the one packet, the acknowledgement to the one packet and the one or more packets subsequent to the acknowledgement are associated with an IEEE 802.11 wireless local area network standard.

13. The method of claim 1 wherein the one packet is associated with an IEEE 802.11 wireless local area network standard, and the selected value in the duration field of the one packet is larger than what is recommended by the IEEE 802.11 wireless local area network standard for the one packet and no greater than the maximum value allowed by the IEEE 802.11 wireless local area network standard for the one packet.

14. The method of claim 6 wherein the one packet being formatted as an IEEE 802.11 MAC frame and the MAC address of that wireless device being included in a receiver address field of the frame.

15. The method of claim 1 wherein the identity information associated with the first set of the plurality of wireless devices includes a listing of a plurality of MAC addresses of the plurality of wireless devices, respectively.

16. The method of claim 11 wherein the one or more wireless devices to whom that wireless device transmits the one or more packets being different from those in the first set, those in the second set, and one which transmits the one packet.

17. The method of claim 11 wherein that wireless device in the first set transmits a packet over the wireless medium to another wireless device subsequent to the acknowledgement during the portion of time, there being no intervening packets transmitted over the wireless medium between the acknowledgement and the packet transmitted to the another wireless device.

18. A system for allowing a plurality of wireless devices to transmit wireless signals within a selected local geographic region while substantially preventing at least one other wireless device from transmitting wireless signals, the system comprising:
   a radio transmitter;
   a processor unit coupled to the radio transmitter; and
   a computer readable medium coupled to the processor unit, the computer readable medium storing instructions executable by the processor unit to perform steps of:
   receiving identity information associated with a first set of a plurality of wireless devices; and
   transmitting over a wireless medium at least one packet via the radio transmitter for each of the plurality of wireless devices in the first set, the at least one packet for the each of the wireless devices including:
      an identity information, including an address, associated with that wireless device, that wireless device being a recipient of the one packet on the wireless medium, and
      a selected value in a duration field of the one packet, the selected value being associated with a portion of time for which that wireless device is to be allowed to transmit wireless signals within the selected local geographic region while restricting at least the wireless devices in the second set from transmitting wireless signals.

* * * * *